(12) United States Patent
Sadykov

(10) Patent No.: US 10,534,695 B2
(45) Date of Patent: Jan. 14, 2020

(54) SYSTEMS AND METHODS FOR INITIALIZING TEST ENVIRONMENTS

(71) Applicant: ATLASSIAN PTY LTD, Sydney (AU)

(72) Inventor: Ilia Sadykov, Sydney (AU)

(73) Assignee: Atlassian Pty Ltd, Sydney (AU)

( * ) Notice: Subject to any disclaimer, the term of this patent is extended or adjusted under 35 U.S.C. 154(b) by 0 days.

(21) Appl. No.: 15/942,291

(22) Filed: Mar. 30, 2018

(65) Prior Publication Data

US 2019/0303272 A1 Oct. 3, 2019

(51) Int. Cl.
  *G06F 11/36* (2006.01)
  *G06F 9/455* (2018.01)
  *G06F 17/24* (2006.01)
  *G06F 8/71* (2018.01)

(52) U.S. Cl.
  CPC ............ *G06F 11/3664* (2013.01); *G06F 8/71* (2013.01); *G06F 9/45558* (2013.01); *G06F 17/24* (2013.01)

(58) Field of Classification Search
  CPC ............ G06F 11/3664; G06F 11/3668; G06F 9/45558; G06F 8/71
  USPC .................................................. 717/124, 121
  See application file for complete search history.

(56) References Cited

U.S. PATENT DOCUMENTS

| | | | | |
|---|---|---|---|---|
| 8,433,953 B1* | 4/2013 | Gaudette | ............... | G06F 11/263 702/123 |
| 8,515,015 B2* | 8/2013 | Maffre | ................... | H04L 43/50 379/10.01 |
| 9,477,837 B1* | 10/2016 | Langton | ................ | G06F 21/566 |
| 9,946,632 B1* | 4/2018 | Chopra | ............... | G06F 11/3672 |
| 2003/0028826 A1* | 2/2003 | Balluff | ................ | G06F 11/2294 714/44 |
| 2005/0289536 A1* | 12/2005 | Nayak | ........................ | G06F 8/61 717/174 |
| 2005/0289538 A1* | 12/2005 | Black-Ziegelbein | ..... | G06F 8/61 717/177 |
| 2010/0257513 A1* | 10/2010 | Thirumalai | ......... | G06F 16/2365 717/134 |
| 2013/0152047 A1* | 6/2013 | Moorthi | ................ | G06F 11/368 717/124 |
| 2013/0305211 A1* | 11/2013 | Attar | ................... | G06F 11/3664 717/102 |
| 2015/0089292 A1* | 3/2015 | Ueda | ....................... | G06F 11/263 714/33 |
| 2016/0292420 A1* | 10/2016 | Langton | ................ | G06F 21/566 |
| 2018/0113680 A1* | 4/2018 | Browning | ................. | G06F 8/30 |

* cited by examiner

*Primary Examiner* — Phillip H Nguyen

(74) *Attorney, Agent, or Firm* — Hickman Palermo Becker Bingham LLP

(57) ABSTRACT

Methods and systems for initializing test environments comprising receiving input defining a plurality of parameters which are used to identify template configuration information which comprises static configuration information and instances of environment variables. A copy of the template configuration information is created and updated based on one or more of the parameters. The updated information is saved as an environment configuration descriptor that defines one or more services required for the test environment. The descriptor is then used to initialize test environment.

17 Claims, 4 Drawing Sheets

SYSTEMS AND METHODS FOR INITIALIZING TEST ENVIRONMENTS

TECHNICAL FIELD

The technical field of the present disclosure generally relates to improved methods, computer software, and/or computer hardware for the initialization of test environments.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Distributed computer software products involve multiple applications running on multiple computer processing systems. For example, a simple client-server product involves a client application to be run on a client machine and a web/application server running on a server machine.

More complex software products can require even more applications. As one example, consider the Jira software product commercially available from Atlassian. Running Jira requires a Jira server (or multiple Jira servers if running in a clustered configuration), a database, a Lightweight Directory Access Protocol (LDAP) engine, and a client-side application (e.g. a web browser). To provide flexibility, Jira supports/can be configured to work with a number of different databases (including, for example, Oracle, MySQL, PostgreSQL, Microsoft SQL Server), a number of different LDAP engines (including, for example, Microsoft Active Directory, Apache Directory Server, Apple Open Directory, FedoraDS), and a number of different client-side web browsers (including, for example, Chrome, Safari, Internet Explorer, Firefox, Safari). Overlaying this, several versions of Jira may be in use/supported at any given time. For example, at the time of filing this application, versions 7.7, 7.3, 7.4, 7.5, 7.6, 7.7 and 7.8 of Jira are supported.

As the complexity of a software product increases, so too does the complexity of properly testing new developments before releasing them.

Returning to the Jira example, consider a developer who has developed a new feature (either to the core Jira software product or an add-on/plug-in/integration that is intended to work with Jira) or bug-fix. Depending on the nature of the feature/fix, thorough testing could potentially involve testing the feature for all combinations of Jira version/database/LDAP engine/web browser. For example, a feature that is stable for Jira version 7.7 running on MySQL will not necessarily mean the same feature is stable for Jira 7.7 running Oracle.

In order to test software products such as Jira, test environments are typically set up using virtualization or containerization tools. Properly setting up even a single test environment can, however, be a difficult and time consuming task—let alone setting up multiple test environments to account (for example) for software product variations.

SUMMARY

The appended claims may serve as a summary of the invention.

Figure 1:
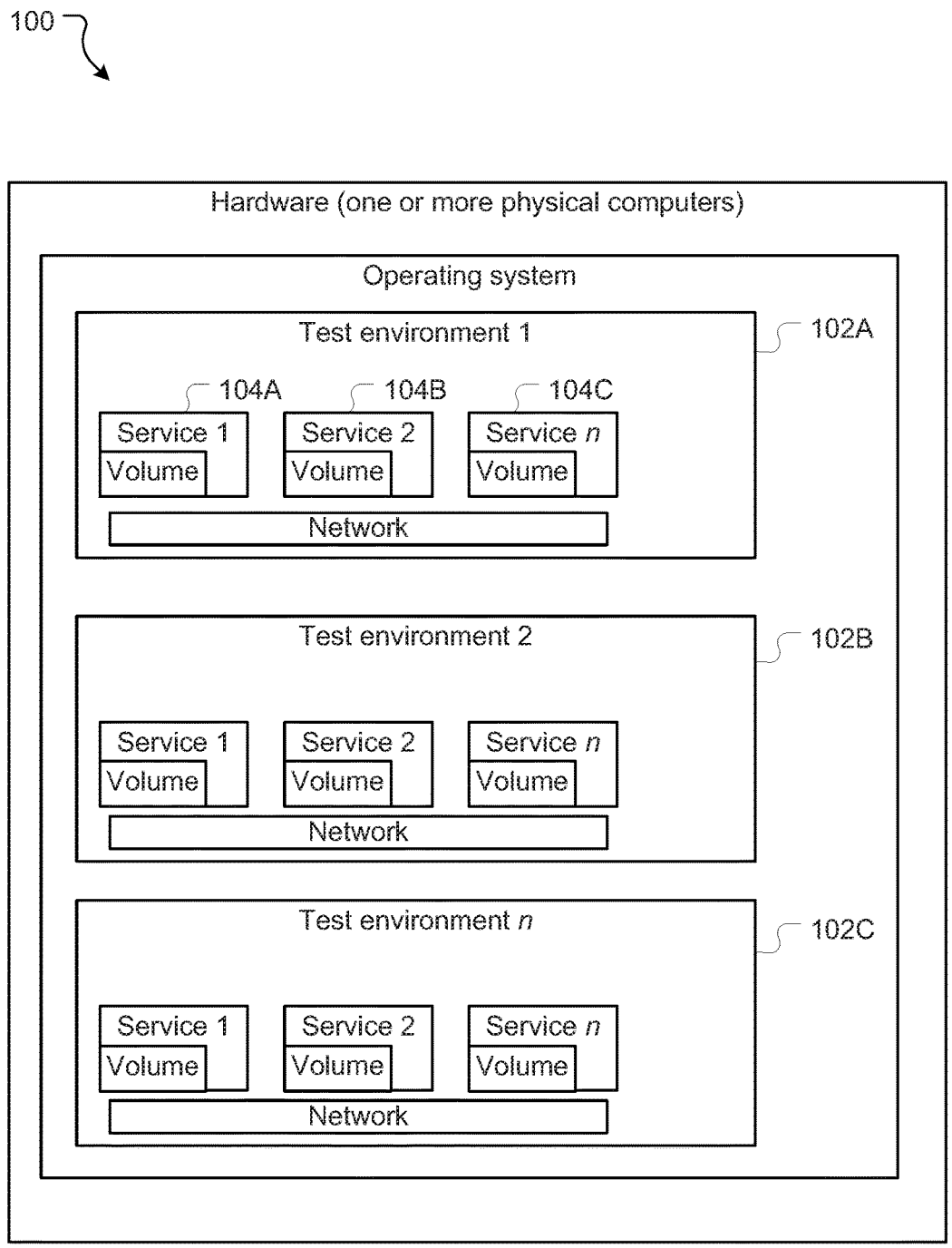
FIG. 1 is a conceptual representation of a test environment running on a computer system.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth to provide a thorough understanding of the present invention. It will be apparent, however, that the present invention may be practiced without these specific details. In some instances, well-known structures and devices are shown in block diagram form to avoid unnecessary obscuring.

As noted above, containerization tools are often used to create test environments for testing new software product features or fixes. Generally speaking, and with reference to FIG. 1, a containerized test environment 102 runs on physical hardware 100. The physical hardware may be a single computer system (for example a system such as 450 described below) or multiple systems operating together, and may concurrently run multiple test environments (e.g. 102A, 102B, 102C). A test environment includes one or more services 104 (e.g. services 104A, 104B, and 104C of test environment 102A).

One example of a containerization tool is Docker, made available by Docker, Inc. For the purposes of illustration the examples herein will be provided with reference to Docker. The feature and principles described herein can, however, be applied to other containerization systems such as Docker Swarm, Kubemates, or other systems/tools.

Initializing a container requires various configuration options to be defined, such as the image(s) for the service(s) that are to be started in the container, volumes to be used by the container/services started therein, ports to be exposed, networks to be joined, environment variables, and other container configuration options. These configuration options are typically described/saved in an environment configuration descriptor which is processed by the containerization tool to create the containers described (and, accordingly, the test environment). In the context of Docker, the environment configuration descriptor is a Docker Compose file.

Template Configuration Information

Using configuration descriptors (such as Docker compose files) can assist the process of setting up test environments, particularly where the same environment needs to be set up numerous times. Preparing configuration descriptors, however, can be both difficult and time consuming.

In order to address this issue, and to facilitate the automatic initialization of test environments, the embodiments described herein make use of template configuration information. The template configuration information generally comprises static configuration information and variable configuration information. The template configuration information can be used to automatically generate a configuration descriptor. The template configuration information may also be used to generate or make available other associated files that are required to initialize a test environment.

Static configuration information comprises information that is included in a given configuration descriptor or associated file without change.

Variable configuration information comprises of one or more instances of one or more environment variables that are updated at the time a particular configuration descriptor and any associated files are generated. A given environment variable may be updated based on one or more parameters provided by a user or based on a predefined value for the variable.

The template configuration information may be stored in any desired format and file structure. Typically, however, the template configuration information will be stored across multiple files in a logical manner, for example arranged/divided to facilitate reusability of the files in generating configuration descriptors for different test environments. Some files may include only static configuration information (or only variable configuration information). Generally, however, a given file will include both static and variable configuration information and thus be customizable during generation of a configuration descriptor. By drawing together the appropriate files, and updating the variable configuration information according to user parameters and/or default values, configuration descriptors and/or associated files that are customized/tailored for specific test environments can be generated.

As discussed below, during an environment initialization process the static configuration information does not change. Instances of the environment variables, however, are automatically updated based on user-defined parameters or default values. In this way the template configuration information is used to generate a specific environment configuration descriptor which can be used to initialize a specific environment required by the user.

Generally speaking, the template configuration information is provided to allow various, commonly used test environments to be initialized. For example, in some instances the template configuration information may be used to generate a different test environment for each software product to be tested—e.g. a Product A test environment, a Product B test environment, a Product C test environment and so on. In other cases, different versions of a given product may require different test environments. For example, if versions 1.0-1.9 of Product A all require a similar test environment and versions 2.0-2.9 of Product A all require a similar test environment (though one that is different to the environment for versions 1.0-1.9), then the template configuration information will enable the generation of different test environments for the same product: a Product A v1.0-1.9 template and a Product A v2.0-2.9 template. In this case there may, be overlap in template configuration information used to generate the two configuration descriptors. For example, if all versions of the product require a particular database server/application then template configuration information in respect of that particular database/server application can be provided in a common file that is used in the generation of multiple configuration descriptors.

In order to provide a specific illustration, consider three products available from Atlassian: Jira, Confluence, and Bitbucket. In this example, template configuration information is provided that can be used to generate configuration descriptors for the different modes of operation (in this case different architectures, server and cluster) of each different software product (Jira, Confluence, Bitbucket). In this example, therefore, six configuration descriptors (and any associated files required for the test environments) can be generated using the template configuration information: Jira server; Jira cluster; Confluence server; Confluence cluster; Bitbucket server; and Bitbucket cluster.

To achieve this in an efficient manner, the template configuration information may be provided across various files (each file potentially comprising both static and variable configuration information). For example, the template configuration information may be comprised in: one or more common files comprising configuration information used in generating configuration descriptors for multiple products (e.g. Jira, Bitbucket, and Confluence); one or more product-specific files comprising configuration information used in generating configuration descriptors in respect of one product but not another (e.g. Jira files containing configuration information necessary for a test descriptor in respect of any Jira test environment, but not in a Bitbucket or Confluence test environment); and one or more mode specific files comprising configuration information used in generating configuration descriptors for the specific product and mode of operation (e.g. Jira server files containing configuration information necessary for a test descriptor in respect of a Jira server environment, Jira cluster files containing configuration information necessary for a test descriptor in respect of a Jira cluster environment, etc.). Within these files, the environment variables may include, for example: a project name (used to identify services/components that are part of one running test environment versus another running test environment); a version identifier (used to specify a particular version of the product is being tested); and port information (used to specify which port(s) are to be exposed).

Further environment variables could be introduced and used as desired. For example, for products which require database services, environment variables (and corresponding dynamic and static configuration information) may be provided to allow an environment to be initialized with various databases—e.g. Oracle, MySQL, PostgreSQL, Microsoft SQL Server. Returning to the Atlassian products mentioned above, then, a user could, for example, elect to initialize a test environment for Jira cluster running with Postgres or for Jira cluster running with an alternative database (e.g. Oracle).

Continuing with the specific example, and again for illustrative purposes only, Table A below provides template configuration information for a cluster configuration of Jira using Postgres. The example in Table A is in the format of a Docker Compose file:

TABLE A

Example template configuration information

```
version: '2'
services:
  proxy:
    image: abiosoft/caddy
    volumes:
      - ./Caddyfile:/etc/Caddyfile
```

TABLE A-continued

| Example template configuration information |
| --- |

```
    ports:
        - {{.Port1}}:80
    networks:
        - {{.ProjectName}}Network
  jira1:
    image: dchevell/jira-core:{{.Version}}
    volumes:
        - {{.ProjectName}}Node1:/var/atlassian/application-data/jira
        - {{.ProjectName}}Shared:/var/atlassian/application-data/shared
    networks:
        - {{.ProjectName}}Network
environment:
        - CATALINA_CONNECTOR_PROXYNAME=localhost
        - CATALINA_CONNECTOR_PROXYPORT={{.Port1}}
    command: >
        /bin/sh -c "chown -R 'whoami':'whoami' /var/atlassian/application-data/jira &&
            chmod -R 777 /var/atlassian/application-data/shared &&
            echo 'jira.node.id = jira' > /var/atlassian/application-data/jira/cluster.properties &&
            echo 'jira.shared.home = /var/atlassian/application-data/shared' >> /var/atlassian/application-data/jira/cluster.properties &&
            /entrypoint.sh -fg"
  jira2:
    image: dchevell/jira-core:{{.Version}}
    volumes:
        - {{.ProjectName}}Node2:/var/atlassian/application-data/jira
        - {{.ProjectName}}Shared:/var/atlassian/application-data/shared
    networks:
        - {{.ProjectName}}Network
    environment:
        - CATALINA_CONNECTOR_PROXYNAME=localhost
        - CATALINA_CONNECTOR_PROXYPORT={{.Port1}}
    command: >
        /bin/sh -c "chown -R 'whoami':'whoami' /var/atlassian/application-data/jira &&
            chmod -R 777 /var/atlassian/application-data/shared &&
            echo 'jira.node.id = jira2' > /var/atlassian/application-data/jira/cluster.properties &&
            echo 'jira.shared.home = /var/atlassian/application-data/shared' >> /var/atlassian/application-data/jira/cluster.properties &&
            /entrypoint.sh -fg"
  installer:
    image: docker:latest
    entrypoint: /bin/sh
    depends_on:
        - jira2
    volumes:
        - {{.ProjectName}}Node1:/node1
        - {{.ProjectName}}Node2:/node2
        - {{.ProjectName}}Shared:/shared
        - /var/run/docker.sock:/var/run/docker.sock
        - ./wait-for.sh:/bin/wait-for.sh:ro
    networks:
        - {{.ProjectName}}Network
    command: >
        -c "docker stop {{.ProjectName}}yml_jira2_1 &&
            apk update && apk add curl &&
            wait-for.sh jira1:8080 -n '.*/startup.*' -t 500 &&
            wait-for.sh jira1:8080 -n '.*/secure/Setup.*' -t 500 &&
            echo 'Node1 is ready, copy shared data...' &&
            cp -fR /node1/* /shared &&
            cp -fR /node1/* /node2 &&
            rm -fR /node2/log && rm -fR /shared/log &&
            echo 'Starting node2...' &&
            docker start {{.ProjectName}}yml_jira2_1 &&
            echo 'Waiting until setup finishes...' &&
            docker logs -f {{.ProjectName}}yml_setup_1 &&
            echo 'Cluster is now ready to use' &&
            docker rm -f {{.ProjectName}}yml_setup_1 &&
            docker rm -f {{.ProjectName}}yml_chrome_1 &&
            docker rm -f {{.ProjectName}}yml_installer_1"
  postgres:
    image: postgres:{{if not (index .Custom "DBVersion")}}9.3{{else}}{{index .Custom "DBVersion"}}{{end}}
    networks:
        - {{.ProjectName}}Network
```

TABLE A-continued

Example template configuration information

```
    volumes:
      - {{.ProjectName}}Data:/var/lib/postgresql/data/pgdata
      - ./backup.sql:/backup.sql:ro
    environment:
      - POSTGRES_USER={{index .Custom "DBUser"}}
      - POSTGRES_DB={{index .Custom "DBName"}}
      - POSTGRES_PASSWORD={{index .Custom "DBPassword"}}
      - PGDATA=/var/lib/postgresql/data/pgdata
  setup:
    image: gradle:alpine
    working_dir: /home/gradle
    volumes:
      - ./setup.gradle:/home/gradle/build.gradle
      - ./license.txt:/home/gradle/license.txt
    networks:
      - {{.ProjectName}}Network
    command: "gradle setup --stacktrace"
    environment:
      - URL=http://jira1:8080
      - BROWSER=http://chrome:4444
      - DBTYPE=postgres72
      - DBHOST=postgres
      - DBNAME=postgres
      - DBPORT=5432
      - DBUSER=postgres
      - DBPASS=mysecretpassword
      - APPNAME={{.ProjectName}}Jira
      - BASEURL=http://localhost:8080
  chrome:
    image: selenoid/chrome:62.0
    privileged: true
    shm_size: 256M
    networks:
      - {{.ProjectName}}Network
volumes:
  {{.ProjectName}}Shared:
  {{.ProjectName}}Data:
  {{.ProjectName}}Node1:
  {{.ProjectName}}Node2:
networks:
  {{.ProjectName}}Network:
    driver: bridge
    ipam:
      driver: default
```

In the example template configuration information shown in Table A, instances of environment variables are denoted by double braces. These include: the version variable {{.Version}}, which is used to ensure that services point to the required images; the port variable {{.Port1}}, used to ensure the required ports are exposed; and the project name variable {{.ProjectName}} which is included in network, volume, command, and environment details so that components created can be identified as being part of a particular project.

As can also be seen in Table A, as the template configuration information is for a clustered configuration of the software product in question (Jira), two independent product services are defined (Jira 1 and Jira 2), along with a database service (Postgres).

Alternative environment variables can, of course, be defined as required by a particular implementation.

In Table A, the 'Postgres' portion of the template configuration information is italicized. This is to illustrate the ability to modularize the configuration information as described above. As Postgres may be required for a number of different test environments, instead of repeating this information in multiple template configuration files it may be stored in a dedicated file (e.g. a Postgres.yml file). The information from that file can then be drawn into an environment configuration descriptor as and when required. A particular example of such a Postgres.yml file is shown in Table B below:

TABLE B

Example postgres.yml file

```
service:
  image: postgres: {{if not (index .Custom "DBVersion")}}9.3{{else}}{{index .Custom "DBVersion"}}{{end}}
  networks:
    - {{.ProjectName}}Network
  volumes:
    - {{.ProjectName}}Data:/var/lib/postgresql/data/pgdata
    - ./backup.sql:/backup.sql:ro
```

TABLE B-continued

Example postgres.yml file

```
environment:
    - POSTGRES_USER={{index .Custom "DBUser"}}
    - POSTGRES_DB={{index .Custom "DBName"}}
    - POSTGRES_PASSWORD={{index .Custom "DBPassword"}}
    - PGDATA=/var/lib/postgresql/data/pgdata
```

The template configuration information required for the generation of configuration descriptors is made available to the test environment initialization process (described below). This can be achieved in various ways. For example, template configuration information may be included in an installation package for the testing application and saved to a local memory of the machine on which the testing application is installed. Alternatively, the testing application may be configured to fetch required template configuration information from a remote location as required during execution, in which case the templates are made available at that location.

Test Environment Initialization

Figure 2:
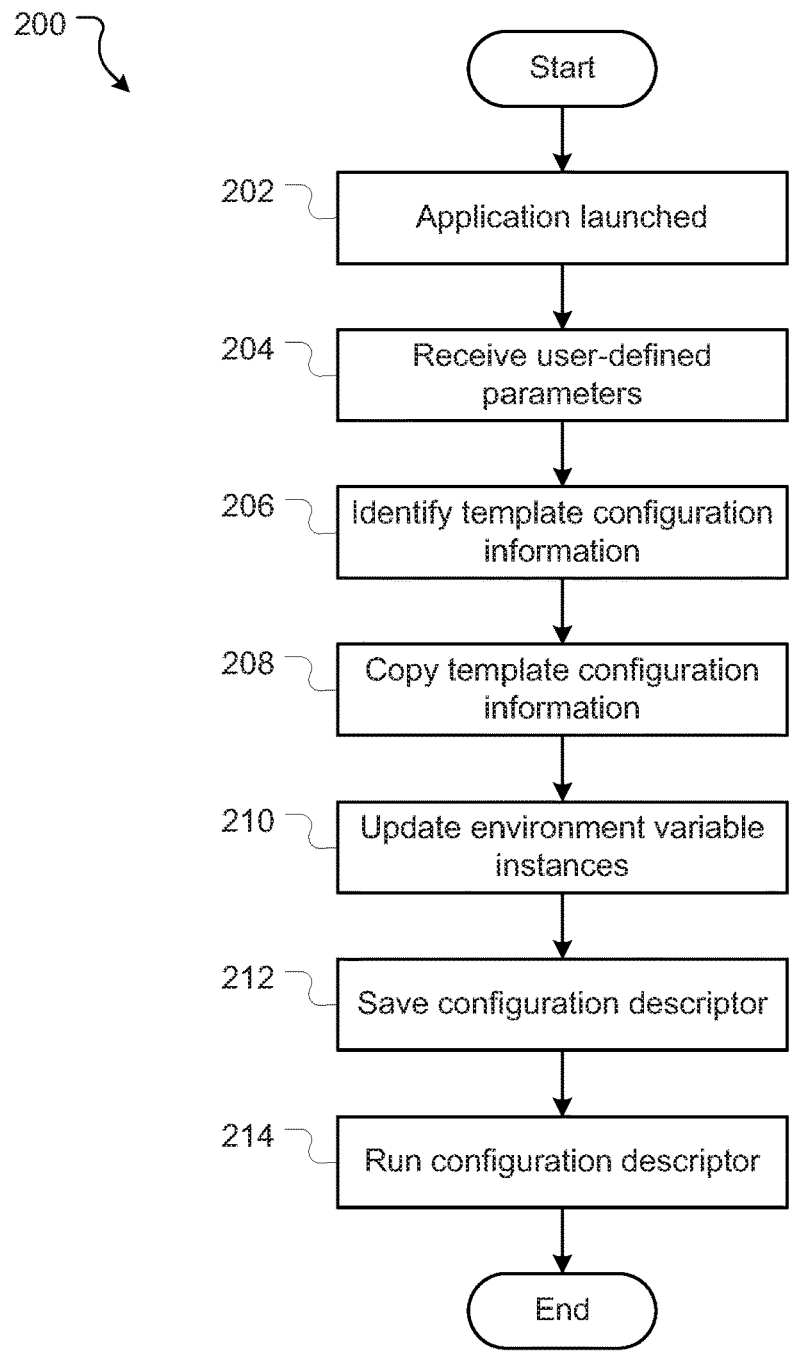
FIG. 2 is a flowchart illustrating processing involved in automatically initializing a test environment.

FIG. 2 provides a flow chart 200 illustrating processing steps involved in automatically initializing a test environment.

The processing steps shown in FIG. 2 are performed by a computer system (such as 450 described below) which is specially configured to perform the steps. This configuration may, for example, be by a processor (such as processor 454) executing computer readable instructions stored on a memory accessible thereto. In certain embodiments, configuration of the computer system is achieved by installation and execution of a testing application.

At 202, the testing application is launched/executed.

The testing application may be configured for execution in various ways. For example, the testing application may be executed from a command line interface using an appropriate command (e.g. "$ application run"). Alternatively, the testing application may be executed by activation of a button or other graphical user interface control.

At 204, user-defined parameters are received.

The user-defined parameters may be input by a user at the same time as executing the application. For example, where execution is via a command line interface, a user may enter parameters with the execution command—e.g. "$ application run <parameter 1> <parameter 2> ... <parameter n>". Alternatively, the application may ask a user to provide the user-defined parameters during execution. For example, once the testing application has been run input requests may be made asking the user for the required parameters. Such requests may be made by text in a command line or graphical user interface (e.g. "$ please enter the [value required for parameter n]") or if the application has a graphical user interface various prompts and/or menus may be provided allowing the user to specify the user-defined parameters.

As mentioned, the template information may comprise default values for certain environment variables. In this case the user-defined parameters may further include override parameters which identify a particular variable and an override value for that variable. For example, if 'Port' is an environment variable it may have a default value of 8080. This may be overridden, however, by a command such as "—var Port=8082".

At 206, the template configuration information required to generate the configuration descriptor for the required test environment is identified. The relevant environment configuration information is identified based on one or more of the user-defined parameters which indicate, for example, the particular software product to be tested.

At 208, a copy of the template configuration information identified at 206 is created. This may involve creating copies of multiple separate files across which the required template configuration information is stored.

At 210, the environment variable instances in the copy of the template configuration information created at 208 are updated. The environment variable instances in the template configuration information are updated based on one or more of the user-defined parameters. Environment variable instances in the template configuration information may also be update based on pre-defined default values (though those default values may be overridden by use of appropriate controls/commands on or after executing the testing application).

In certain embodiments, each environment variable in the template configuration information is denoted/flagged by a particular character sequence. In this case, the testing application updates the copy of the template configuration information by, for each environment variable: searching for all instances of the particular character sequence used to flag that environment variable and replacing each instance of the particular character sequence with a new character string. In certain embodiments, and for certain environment variables, the replacement string is taken directly from one of the user-defined parameters. In other cases, the replacement string is taken from a default value for the variable (presuming the default value has not been overridden by user input).

At 212, the updated copy of the template configuration information is saved as an environment configuration descriptor. Relevantly, the original template configuration information remains unchanged in the process (so it can be used in the generation of additional/alternative test environments in the future). The saved environment configuration descriptor may be saved in a directory dedicated for such descriptors—e.g. a deployment directory or the like—and named based on one or more of the user-defined parameters (e.g. using a 'ProjectName' user-defined parameter).

At 214, the environment configuration descriptor saved at 212 is passed to a containerization tool which uses the descriptor (and any other required files) to initialize the environment described in the descriptor.

Process 200 then ends.

Execution Example

To assist in understanding of the automatic test environment initialization process described above, and to illustrate further features, a specific execution example will be described. The example continues from that described above in which the test application provides template configuration information for a number of different modes of operation of a number of different products that the testing application can be used with.

Figure 3:
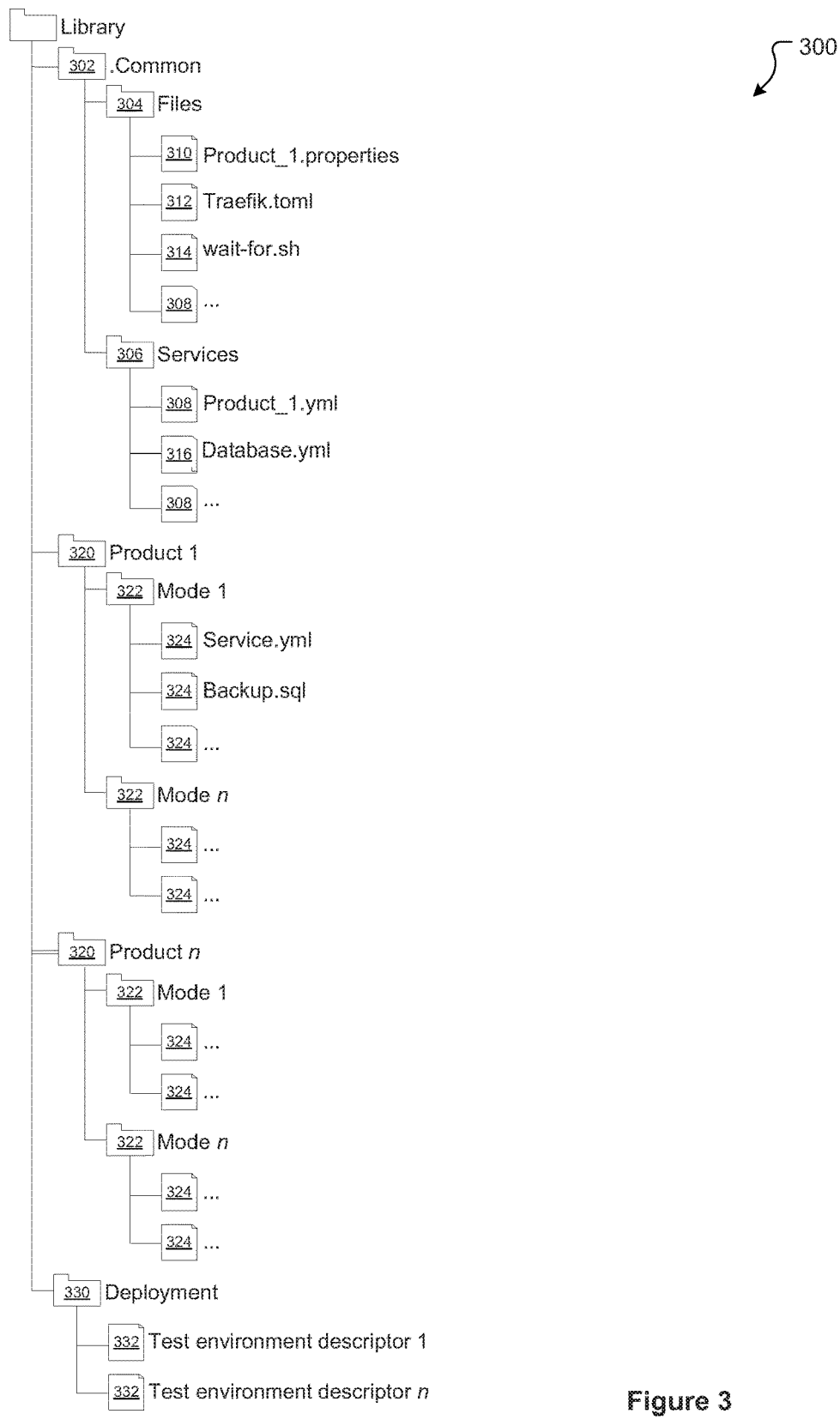
FIG. 3 is a representation of a directory structure.

In this example, installation of the test application creates a directory structure which is used by the test application. FIG. 3 provides one particular directory structure 300 by way of example. In this particular example, the directory structure 300 includes a common directory 302 with a files sub-directory 304 and a services subdirectory 306. The common directory 302 stores files 308 with common configuration information—i.e. configuration information used in generating test environments for multiple products. To illustrate the types of common files that may be provided, the .common/files directory in the present example includes: a properties file 310 storing properties relevant to product 1; a shell script file 312 which may be used in multiple (or all) test environments; and a further configuration file 314 (in this case for configuring a reverse proxy/load balancing functionality) to be commonly used in various test environments. Referring to the example Postgres.yml file described with respect to Table B above, a file 316 such as this could be stored in the common services sub-directory 306.

Product directories 320 are also provided for each product supported. In this instance, each product directory 320 holds separate product mode sub-directories 322 for each mode relevant to the product (e.g. a cluster mode and a server mode). Each product mode directory 322 then holds files 324 relevant for that mode.

Continuing the specific Atlassian implementation example described above (again for illustrative purposes only), product directories 320 may be created for each product supported (e.g. Jira, Bitbucket, Confluence, etc.) with sub-directories 322 for their modes of operation (e.g. server, cluster). Template configuration information used to generate a configuration descriptor for, say, a confluence server test environment may then be accessed from one or more files 324 in the /Confluence/server subdirectory 322 and one or more files in the .common/directory.

Alternative directory/file structures could be created or, indeed, a single (flat) file structure. Further alternatively, and as mentioned, instead of being stored locally the relevant files could be stored remotely and retrieved/accessed from the remote location as needed. The relevant requirement in this regard is that the testing application can find the files required for execution.

In this example the test application is executed (e.g. step 202) by a command line interface using a command with syntax such as "$ application run <project name> <product> <configuration> <version>".

A specific example of an execution command using this syntax, therefore, could be "$ application run myproject Jira cluster 7.6". In this specific example, the user defined parameters (as identified, for example, at 04) are: project name "myproject"; product "Jira"; configuration "cluster"; and version "7.6".

In certain embodiments the version is an optional parameter and, if not specified, the testing application interprets this as the most recent version of the specified product/configuration (and runs a sub-routine to identify what the most recent version for the specified product configuration is).

The testing application then identifies the relevant template configuration information template based on the user-defined parameters (e.g. at 06). In the specific example, the relevant template configuration information is found in a/Jira/Cluster sub-directory (322) and the .common directory (302).

The testing application then creates a copy of the relevant template configuration information from the/Jira/Cluster directory (and the common directory as required) (e.g. at 08) and proceeds to update the environment variable instances in that copy (e.g. at 10).

The example template configuration information of Table A includes three environment variables (port, project name, and version), each variable having one or more instances throughout the template. In the example of Table A: the port variable is denoted by the character sequence '{{.Port1}}'; the project name variable is denoted by the character sequence '{{.ProjectName}}'; and the version variable is denoted by the character sequence '{{.Version}}'. In order to update the copy of the template, the testing application identifies each variable instance (by the particular string denoting that variable) and replaces it with the appropriate value. Specifically, in this example the testing application: identifies each occurrence of the string '{{.ProjectName}} and replaces it with the user-defined 'project name' parameter (e.g. 'myproject'); identifies each occurrence of the string '{{.Version}} and replaces it with the user-defined 'version' parameter (e.g. '7.6'); and identifies each occurrence of the string '{{.Port}} and replaces it with (in this case) a non-overridden default value of 8080.

The updated copy of the template configuration information is then saved as an environment configuration descriptor (e.g. at 212). In this example the copy is saved in a deployment directory 330 which is created specifically to store environment configuration descriptors 332 generated by the test application. The deployment directory 330 may be created on installation of the testing application or during runtime (following a check by the testing application to see whether the deployment directory already exists or not).

Table C below shows part of the template configuration information shown in Table A and the corresponding part of the environment configuration descriptor as saved once the environment variable instances have been updated:

TABLE C template configuration information/descriptor comparison

```
...                                    ...
proxy:                                 proxy:
  image: <path>                          image: <path>
  volumes:                               volumes:
   - <path>                               - <path>
  ports:                                 ports:
   - {{.Port1}}:80                        - 8080:80
  networks:                              networks:
   - {{.ProjectName}}Network              - myprojectNetwork
jira1:                                 jira1:
  image: /jira:{{.Version}}              image: /jira:7.6
  volumes:                               volumes:
   - {{.ProjectName}}Node1:/ <path>       - myprojectNode1:/ <path>
   - {{.ProjectName}}Shared:/ <path>      - myprojectShared:/ <path>
  networks:                              networks:
   - {{.ProjectName}}Network              - myprojectNetwork
...                                    ...
```

As can be seen, the {{.Port1}}, {{.ProjectName}}, and {{.Version}} environment variable instances from the template configuration information have been updated. For example, the unspecified image of the template ("jira:{{.Version}}") is updated to a specific image ("jira:7.6") which can be found by the containerization tool (e.g. Docker) when the configuration descriptor is run.

Once the environment configuration descriptor has been saved it can be run (E.g. at 214). Where the descriptor is a Docker Compose file it is run using Docker (e.g. a "docker-compose" command).

In addition to initializing test environments as described above, the testing application may provide additional functionality with respect to those test environments.

For example, the testing application may allow users to query the status of any test environments currently running. Where the testing application is operable by a command line interface, this may be achieved, for example, by a command such as "$ application status <ProjectName>". On execution of such a command the testing application is configured to return information regarding the services involved in the project identified by ProjectName project—e.g. their status and how long they have been running for.

Returning again to the specific example described above where the testing application has been used to initialize a test environment for Jira Cluster version 7.6 under the project name "myproject", running the command "$ application status myproject" may return an output such as that shown in Table D below:

TABLE D

Example status report: single project

| Status myproject: | | |
|---|---|---|
| proxy | Up | 7 minutes |
| jira 1 | Up | 7 minutes |
| jira 2 | Up | 7 minutes |
| postgres | Up | 7 minutes |

As can be seen, Table D reports on the services that have been initialized as part of the project (e.g. proxy, jira 1, jira 2, installer, postgres, setup, and Chorme), their current statuses (e.g. Up), and how long the reported status has been occurring.

As a further example, the testing application may allow a user to query the status of all current projects. For example, if three projects have been run (myproject1, myproject 2, myproject 3) based on Jira server, Confluence server, and BitBucket server respectively, the command "$ application ls" may return an output such as that shown in Table E below:

TABLE E

Example status report: all deployments

| Number of existing deployments: 1 | | |
|---|---|---|
| [myproject 1] | | |
| jira | Up | 7 minutes |
| postgres | Up | 7 minutes |
| [myproject 2] | | |
| confluence | Up | 2 minutes |
| synchrony | Up | 2 minutes |
| postgres | Up | 2 minutes |
| [myproject 3] | | |
| bitbucket | Up | 12 minutes |
| postgres | Up | 12 minutes |

The embodiments described herein provide a direct improvement to computer systems and computer technology. Specifically, the improved methods discussed above may reduce the amount of memory, network bandwidth, processing time, and/or power usage needed when initializing test environments. The embodiments described herein also offer an improvement in the overall efficiency of a computing system, resulting in a faster, more responsive computer system. Further, the user experience of initializing and using test environments is greatly improved and simplified. Additionally, the embodiments described herein describe a technical solution to a technical problem that is rooted in computer systems and the use of networked computers. These advantages and others described throughout this specification are clear improvements over existing systems that are unable to provide these improvements or advantages.

Hardware Overview

The operations/techniques described herein are implemented by one or more special-purpose computing systems or devices. A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a porTable Domputer system, a handheld device, a networking device or any other device that incorporates hard-wired and/or program logic to implement relevant operations.

Figure 4:
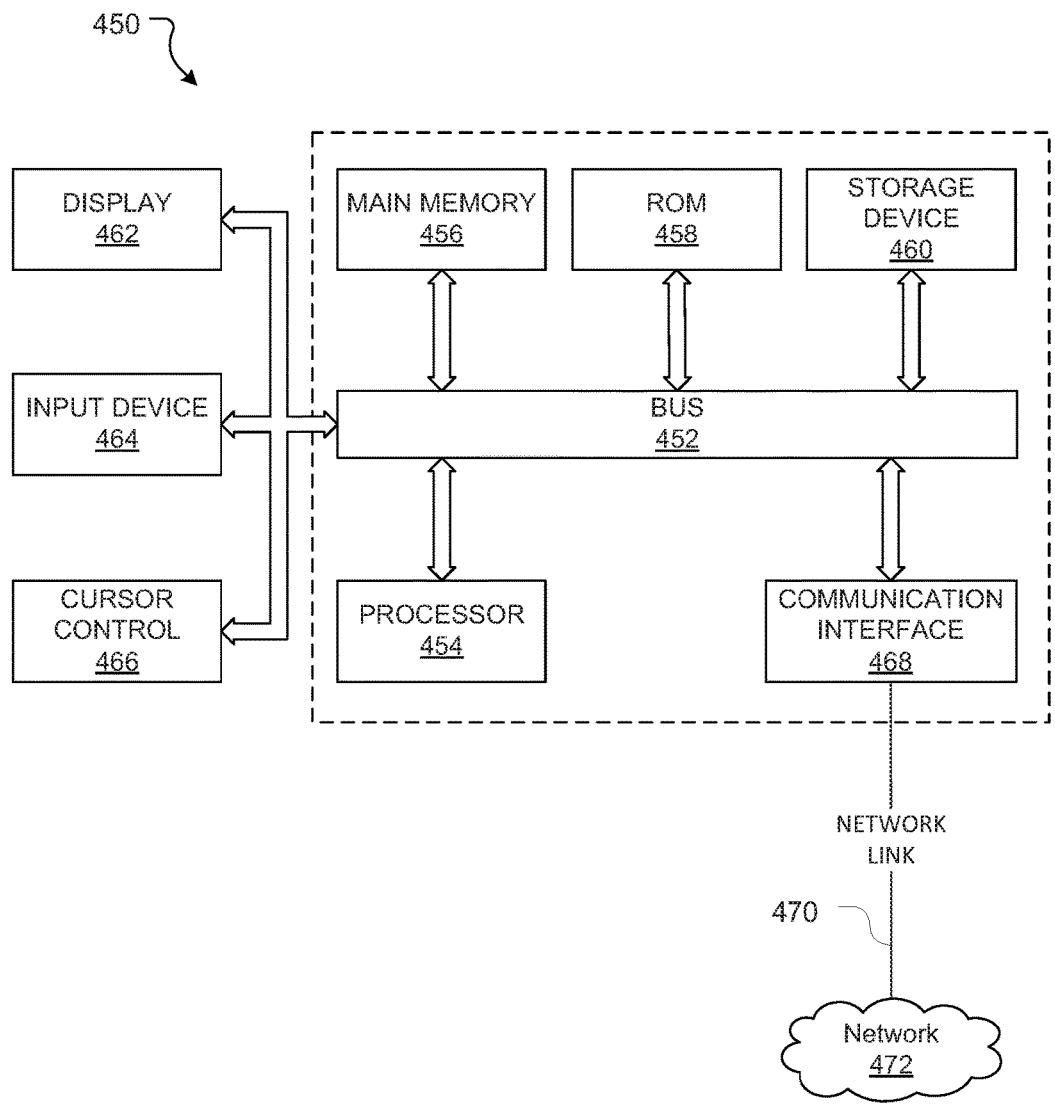
FIG. 4 is a block diagram illustrating a computer system, which may be used to implement various embodiments.

By way of example, FIG. 4 provides a block diagram that illustrates one example of a computer system 450 upon which embodiments of the invention may be implemented. Computer system 450 includes a bus 452 or other communication mechanism for communicating information, and a hardware processor 454 coupled with bus 452 for processing information. Hardware processor 454 may be, for example, a general purpose microprocessor, a graphical processing unit, or other processing unit.

Computer system 450 also includes a main memory 456, such as a random access memory (RAM) or other dynamic storage device, coupled to bus 452 for storing information and instructions to be executed by processor 454. Main memory 456 also may be used for storing temporary variables or other intermediate information during execution of instructions to be executed by processor 454. Such instructions, when stored in non-transitory storage media accessible to processor 454, render computer system 450 into a special-purpose machine that is customized to perform the operations specified in the instructions.

Computer system 450 further includes a read only memory (ROM) 458 or other static storage device coupled to bus 452 for storing static information and instructions for processor 454. A storage device 460, such as a magnetic disk or optical disk, is provided and coupled to bus 452 for storing information and instructions.

In case the computer system 350 is a client device—e.g. a device from which the test environment initialization process 200 described above is run, the computer system 450 may be coupled via bus 452 to a display 462 (such as an LCD, LED, touch screen display or other display), for displaying information to a computer user. An input device 464, including alphanumeric and other keys, may be coupled to the bus 452 for communicating information and command selections to processor 454. Another type of user input device is cursor control 466, such as a mouse, a trackball, or cursor direction keys for communicating direction information and command selections to processor 454 and for controlling cursor movement on display 462.

According to one embodiment, the techniques herein are performed by computer system 450 in response to processor 454 executing one or more sequences of one or more instructions contained in main memory 456. Such instructions may be read into main memory 456 from another storage medium, such as a remote database. Execution of the sequences of instructions contained in main memory 456 causes processor 454 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 460. Volatile media includes dynamic memory, such as main memory 456. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 452. Transmission media can also take the form of acoustic or light waves, such as those generated during radio-wave and infra-red data communications.

Computer system 450 also includes a communication interface 468 coupled to bus 452. Communication interface 468 provides a two-way data communication coupling to a network link 470 that is connected to the communication network 472. For example, communication interface 468 may be an integrated services digital network (ISDN) card, cable modem, satellite modem, etc. As another example, communication interface 468 may be a local area network (LAN) card to provide a data communication connection to a compatible LAN. Wireless links may also be implemented. In any such implementation, communication interface 468 sends and receives electrical, electromagnetic or optical signals that carry digital data streams representing various types of information.

Computer system 450 can send messages and receive data, including program code, through the network(s) 472, network link 470 and communication interface 468.

As described previously, the computer system 450 as described above may be configured in a plurality of useful arrangements. In one arrangement, the computer system 450 is a desktop or server computer comprising one or more non-transitory computer-readable data storage media stored with one or more sequences of instructions/software modules which when executed cause the computer to perform the operations/techniques that are described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The embodiments have been described using Atlassian software products (e.g. Jira, Confluence and Bitbucket) as specific examples of a software products for which testing is being performed, and Docker (commercially available from Docker, Inc.) as a containerization system. The features and principles described herein may, however, be used with alternative containerization systems and for testing any appropriate software product.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using process steps. The functionality/processing of a given process step could potentially be performed in various different ways and by various different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of two or more of the individual features mentioned or evident from the text or drawings. These different combinations constitute various alternative aspects of the embodiments.

What is claimed is:

1. A computer-implemented method for initializing a test environment for a software product, the method comprising:
   receiving input defining a plurality of parameters comprising at least a product parameter defining the software product;
   identifying, based on the product parameter of the plurality of parameters, one or more files comprising template configuration information for the software product, the template configuration information comprising static configuration information and one or more instances of one or more environment variables, each environment variable indicated by a particular character sequence, at least one parameter of the plurality of parameters mapped directly to a particular environment variable of the one or more environment variables;
   creating a copy of the one or more files comprising template configuration information;
   updating, based on one or more of the plurality of parameters, the environment variable instances in the copy of the one or more files comprising template configuration information the particular environment variable updated by:
      searching for all instances of the particular character sequence used to indicate the particular environment variable, and
      replacing each instance of the particular character sequence used to indicate the particular environment variable with the at least one parameter that maps to the particular environment variable;
   saving the updated copy of the one or more files comprising template configuration information as an environment configuration descriptor, the environment configuration descriptor defining one or more services required for the test environment;

causing creating and initializing a container based on the environment configuration descriptor, the container executing one or more services required for the test environment.

2. The computer-implemented method of claim 1, wherein the plurality of parameters comprise a mode parameter defining a particular mode of the software product.

3. The computer-implemented method of claim 1, wherein the plurality of parameters comprise a version parameter defining a particular version of the software product.

4. The computer-implemented method of claim 1, wherein the plurality of parameters comprise a database parameter defining a particular database to be run in the test environment.

5. The computer-implemented method of claim 1, wherein the software product is a clustered software product and wherein the services defined by the environment configuration descriptor include multiple distinct instances of that product.

6. The computer-implemented method of claim 1, wherein each environment variable is indicated by a particular character sequence, and wherein updating the environment variable instances in the copy of the template configuration information comprises, for a given environment variable;

searching for all instances of the particular character sequence used to indicate the given environment variable; and replacing each instance of the particular character sequence used to indicate the given environment variable with a new character string.

7. The computer-implemented method of claim 1, wherein the container is created and initialized using a containerization tool.

8. The computer-implemented method of claim 7, wherein the environment configuration descriptor is a Docker compose file and the containerization tool is Docker.

9. A system for automatically initializing a test environment for testing a software product, the system comprising:
a processor,
a communication interface, and
a non-transitory computer-readable storage medium storing sequences of instructions, which when executed by the processor, cause the processor to:
receive input defining a plurality of parameters comprising at least a product parameter defining the software product;
identify, based on the product parameter of the plurality of parameters, one or more files comprising template configuration information for the software product, the template configuration information comprising static configuration information and one or more instances of one or more environment variables, each environment variable indicated by a particular character sequence, at least one parameter of the plurality of parameters mapped directly to a particular environment variable of the one or more environment variables;
create a copy of the one or more files comprising template configuration information;
update, based on one or more of the plurality of parameters, the environment variable instances in the copy of the one or more files comprising template configuration information, the particular environment variable updated by:
searching for all instances of the particular character sequence used to indicate the particular environment variable, and
replacing each instance of the particular character sequence used to indicate the particular environment variable with the at least one parameter that maps to the particular environment variable;
save the updated copy of the one or more files comprising template configuration information as an environment configuration descriptor, the environment configuration descriptor defining one or more services required for the test environment;
cause creating and initializing a container based on the environment configuration descriptor, the container executing one or more services required for the test environment.

10. The system of claim 9, wherein the plurality of parameters comprise a mode parameter defining a particular mode of the software product.

11. The system of claim 9, wherein the plurality of parameters comprise a version parameter defining a particular version of the software product.

12. The system of claim 9, wherein the plurality of parameters comprise a database parameter defining a particular database to be run in the test environment.

13. The system of claim 9, wherein the software product is a clustered software product and wherein the services defined by the environment configuration descriptor include multiple distinct instances of that product.

14. The system of claim 9, wherein each environment variable is indicated by a particular character sequence, and wherein updating the environment variable instances in the copy of the template configuration information comprises, for a given environment variable;

searching for all instances of the particular character sequence used to indicate the given environment variable; and replacing each instance of the particular character sequence used to indicate the given environment variable with a new character string.

15. The system of claim 9, wherein:
each environment variable is indicated by a particular character sequence;
at least one parameter of the plurality of parameters maps directly to a particular environment variable; and
updating the environment variable instances in the copy of the template configuration information comprises, for the particular environment variable;
searching for all instances of the particular character sequence used to indicate the particular environment variable; and
replacing each instance of the particular character sequence used to indicate the particular environment variable with the at least one parameter that maps to the particular environment variable.

16. The system of claim 9, wherein the container is created and initialized using a containerization tool.

17. The system of claim 16, wherein the environment configuration descriptor is a Docker compose file and the containerization tool is Docker.

* * * * *